Oct. 25, 1966 S. GOLDBERG 3,281,719
MICROWAVE SWITCHING APPARATUS UTILIZING BREAKDOWN GAPS
TRIGGERED BY DIRECT CURRENT CONTROL PULSE AND
RADIO FREQUENCY POWER LEVEL
Original Filed Feb. 15, 1961 13 Sheets-Sheet 1

INVENTOR
Seymour Goldberg

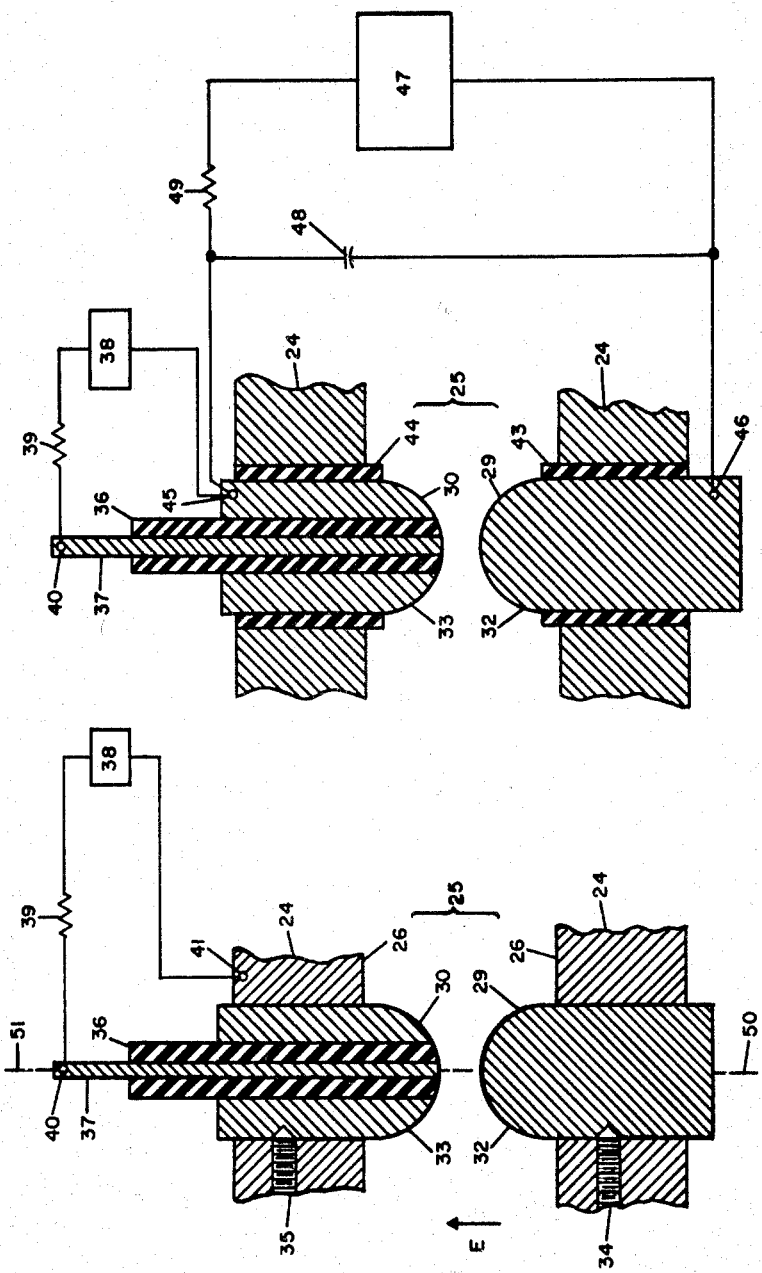

Oct. 25, 1966 S. GOLDBERG 3,281,719
MICROWAVE SWITCHING APPARATUS UTILIZING BREAKDOWN GAPS
TRIGGERED BY DIRECT CURRENT CONTROL PULSE AND
RADIO FREQUENCY POWER LEVEL
Original Filed Feb. 15, 1961 13 Sheets-Sheet 4

INVENTOR
Seymour Goldberg

INVENTOR
Seymour Goldberg

*INVENTOR*
Seymour Goldberg

*INVENTOR*
Seymour Goldberg

*INVENTOR*
Seymour Goldberg

*INVENTOR*
Seymour Goldberg

Oct. 25, 1966 S. GOLDBERG 3,281,719
MICROWAVE SWITCHING APPARATUS UTILIZING BREAKDOWN GAPS
TRIGGERED BY DIRECT CURRENT CONTROL PULSE AND
RADIO FREQUENCY POWER LEVEL
Original Filed Feb. 15, 1961 13 Sheets-Sheet 11

INVENTOR
Seymour Goldberg

INVENTOR
Seymour Goldberg

United States Patent Office 3,281,719
Patented Oct. 25, 1966

3,281,719
MICROWAVE SWITCHING APPARATUS UTILIZING BREAKDOWN GAPS TRIGGERED BY DIRECT CURRENT CONTROL PULSE AND RADIO FREQUENCY POWER LEVEL
Seymour Goldberg, Lexington, Mass., assignor to Edgerton, Germeshausen & Grier, Inc., Bedford, Mass., a corporation of Massachusetts
Continuation of application Ser. No. 89,439, Feb. 15, 1961. This application Nov. 3, 1964, Ser. No. 408,593
5 Claims. (Cl. 333—7)

This application is a continuation of co-pending application Serial Number 89,439, filed February 15, 1961, by the applicant herein, and since abandoned. The present invention relates to microwave systems and in particular to switching apparatus for use therein.

In a number of microwave switching systems designers presently use mechanical linkages of one form or another. These mechanical linkages limit the actuating times of such switches to the millisecond time range. My spark gap microwave switching apparatus does not utilize any mechanical linkages. With it, I obtain actuating times ranging from 1 to 100 nanoseconds, depending upon the power level of the microwave energy being switched and the spacing of the electrodes of my spark gap. By "actuating time" I mean the time the switching apparatus takes to completely operate after the initiating signal is sent. In other microwave switching systems designers use TR or ATR tubes. However, these tubes cannot hold off high microwave voltages because they are designed to break down spontaneously when such voltages are applied and hence do not operate with good time precision. My switching apparatus will hold off such voltages and will operate with a time precision of one nanosecond.

In summary, my invention comprises a spark gap inserted in a wave guide system parallel to the electric field with the main electrodes located at the boundaries of the electric field and at the point where the electric field strength is greatest. A trigger pulse applied to the spark gap ionizes the gas in the vicinity of the gap and the microwave energy being propagated through the wave guide system causes breakdown to occur between the electrodes of the spark gap, thereby creating a microwave arc. This arc is a very effective microwave short circuit. By properly locating such spark gaps, microwave switching apparatus can be devised to "turn on" or "turn off" microwave energy with a time precision on the order of one nanosecond.

It is an object of my invention, therefore, to provide simple and positive microwave switching apparatus.

A further object of the invention is to provide microwave switching apparatus having greatly reduced actuating times.

Still another object is to provide apparatus whereby microwave energy may be switched with a time precision of one nanosecond.

A further object is to provide switching apparatus that will hold off high microwave power until the switching function is initiated.

Another object is to provide switching apparatus, which in the operated condition, dissipates very litle microwave energy.

You will better understand these and other features, objects and advantages of my invention by referring to the drawings and reading the following description of how to make and use it, and the claims.

*Description of drawings*

FIGURE 3 illustrates an enlarger partial section showing the details of the spark gap of FIGURE 1 and a block diagram of a trigger circuit;

FIGURE 4 illustrates a modification of the spark gap and circuit of FIGURE 3;

*Description of spark gap plate 20*

Figure 1:
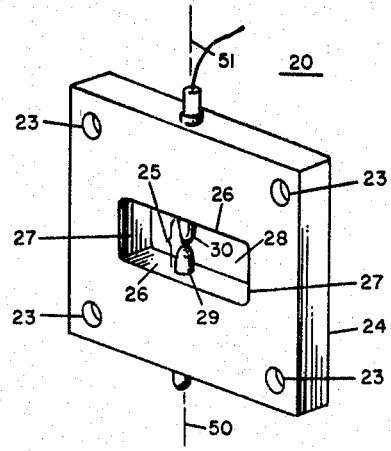
FIGURE 1 is a perspective view of a spark gap plate having a spark gap and designed for mounting between the flanges of two adjacent wave guide sections.
Figure 2:
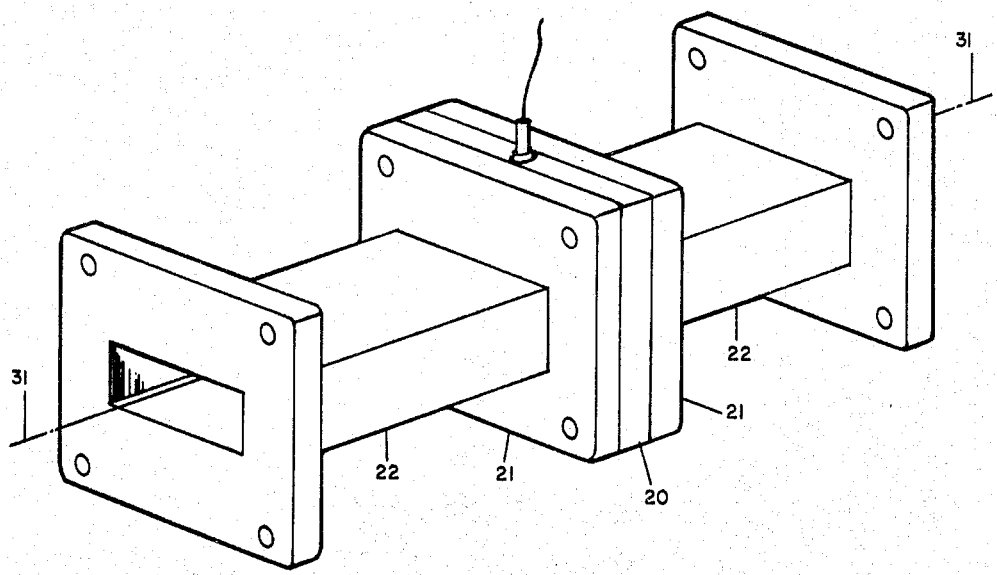
FIGURE 2 is a perspective view of two adjacent wave guide sections with the spark gap plate of FIGURE 1 mounted between them.

Sparkgap plate 20 of FIGURE 1 consists of spark gap holder 24 and spark gap 25. Make spark gap holder 24 preferably of the same material as adjacent wave guide sections 22 (see FIGURE 2). Thus spark gap holder 24 may be made of hardened copper, aluminum, magnesium, silver, brass, or brass with the interior walls 26 and 27 of rectangular hole 28 silver plated, or similar materials of which wave guide sections are made. Design spark gap plate 24 to be mounted by any convenient means, such as mounting holes 23, between the flanges 21 of adjacent wave guide sections 22 as illustrated in FIGURE 2. Machine and polish interior walls 26 and 27 of rectangular hole 28 to exactly the same dimensions and finish as the interior walls of adjacent wave guide sections 22. This avoids introducing discontinuities into the wave guide system at spark gap plate 20.

Mount cylindrical electrodes 29 and 30 parallel to walls 27 and perpendicular to walls 26. Electrodes 29 and 30 are then parallel to the electric field E (illustrated in FIGURE 3) of the microwave energy that may be propagated in the $TE_{10}$ mode (representation of mode of propagation according to that utilized in Chapter 9 of "Electromagnetic Waves And Radiating Systems," by Edward C. Jordan, Prentice-Hall, Inc. 1950) through wave guide sections 22 of FIGURE 2. Further, mount electrodes 29 and 30 in such a manner that their axes 50 and 51 respectively, if extended, will coincide, and will cut the axis 31 of wave guide sections 22. Note that electrodes 29 and 30 are then ideally located at the point where the electric field strength is greatest (see FIGURE 21), although practically the invention will work if electrodes 29 and 30 are less perfectly located and positioned.

Before proceeding further I wish to make it clear that a spark gap 25 may be mounted through the walls of a wave guide section. The use of spark gap plate 20 merely simplifies assembly and disassembly of a wave guide system utilizing the present invention. Note also that spark gap plate 20 is merely a shortened wave guide section.

Description of spark gap 25

Make cylindrical electrode 29 of any electrically conductive metal such as, for example, copper, molybdenum, brass, or stainless steel. In my invention I have used an electrode 29 having its face 32 ground and polished to a hemispherical surface, as illustrated in FIGURE 3. However, other surfaces, such as a conical surface, might be more desirable, depending upon the particular application. Make the fit between electrode 29 and spark gap holder 24 sufficiently tight to provide good electrical contact between them. Use any one of a number of well known means to fix electrode 29 in its desired position. I have used a set screw 34 to accomplish this.

Make electrode 30 of the same or similar material as electrode 29. Make the fit between electrode 30 and spark gap holder 24 sufficiently tight to provide good electrical contact between them. Again, provide means for fixing electrode 30 in position, such as, for example, set screw 35.

Drill an axial hole in electrode 30 before mounting it in spark gap holder 24. Press fit, or fasten with an adhesive, an insulating sleeve 36, made of, for example, glass, ceramic, or plastic, with the axial hole. Then press fit, or fasten with an adhesive, trigger wire 37, made of a conductor such as copper or tungsten, within sleeve 36. One end of this assembly is then ground and polished to form a smooth hemispherical face 33. Again, as stated above, you may find that face 33 should be ground and polished to form a different surface, depending upon the particular application. The assembly of electrode 30, sleeve 36 and trigger wire 37 may then be mounted in spark gap holder 24 in the manner illustrated in FIGURE 3. Note that electrode 29 and 30 and trigger wire 37 form the elements of a triggered spark gap.

While microwave energy is being propagated through the wave guide system a microwave potential exists across electrodes 29 and 30. To avoid spontaneous breakdown across these electrodes adjust the minimum gap spacing between them or the gas pressure, or both.

The phenomenon of potential associated with pulses of microwave energy having high peak powers and at various gap spacings is not well understood. The peak power of a pulse of microwave energy that can be propagated past unenergized electrodes 29 and 30 is in part a function of the wave guide dimensions, gas pressure, electrode geometry, and spacing between the faces 32 and 33 of electrodes 29 and 30 respectively. The exact mathematical-physical relationships are quite complicated and not well understood. With the wave guide dimensions, gas pressure, electrode geometry, and all other pertinent factors remaining constant, the peak power of a pulse of microwave energy that can be propagated past unenergized electrodes 29 and 30 then is a function of the spacing between faces 32 and 33. I will use the term $S_B$ to define the maximum spacing between faces 32 and 33 at which spontaneous breakdown will occur between unenergized electrodes 29 and 30 when a pulse of microwave energy having a peak power $P_P$ is attempted to be propagated thereby. Then, if the spacing S is greater than $S_B$, spontaneous breakdown will not occur when a pulse of microwave energy having a peak power $P_P$ is propagated past unenergized electrodes 29 and 30.

Trigger circuit

Any one of a number of trigger circuits may be used. For example, I used a trigger circuit 38 similar to that disclosed by H. E. Edgerton in United States Letters Patent No. 2,478,906 issued on August 16, 1949. I also added limiting resistor 39 having a value of about 100 ohms in series with trigger circuit 38 to protect it in the event an arc forms a short circuit between trigger wire 37 and electrode 30. The series circuit of trigger circuit 38 and limiting resistor 39 is connected to trigger wire 37 at a point 40 and to spark gap holder 24 at a point 41.

Note that ceramic sleeve 36 must be thick enough to prevent the trigger circuit output voltage pulse from breaking down from trigger wire 37 directly through ceramic sleeve 36 to electrode 30.

Operation

A microwave potential exists across electrodes 29 and 30 while microwave energy is being propagated through the wave guide system. After trigger circuit 38 warms up, trip it at the desired time. The trigger circuit voltage pulse ionizes the gas in the vicinity of face 33 between trigger wire 37 and electrode 30. This ionization is sufficient for the microwave potential to break down the gap between electrodes 29 and 30 thereby creating a microwave arc between these electrodes. The arc presents an extremely small shunting inductance which for practical purposes can be considered as a short circuit.

Example

In testing my invention in an x-band system, I cut screw threads (not shown) on the outside cylindrical surfaces of electrodes 29 and 30. Spark gap holder 24 was then drilled and tapped to receive electrodes 29 and 30. Thus I was able to vary the gap spacing from 0.010 inch to 0.125 inch in an x-band rectangular wave guide system having interior dimensions of 0.900 inch by 0.400 inch. I applied from 20 to 40 kilowatts peak microwave power at a frequency of 9.3 gigacycles to the system. The transition time from open to short circuit at the spark gap was less than one nanosecond at the shorter gap spacings and on the order of seven nanoseconds at a gap spacing of 0.125 inch. Moreover, $S_B$ increased as the pulse microwave power peaks increased from 20 to 40 kilowatts peak power.

Figure 5:
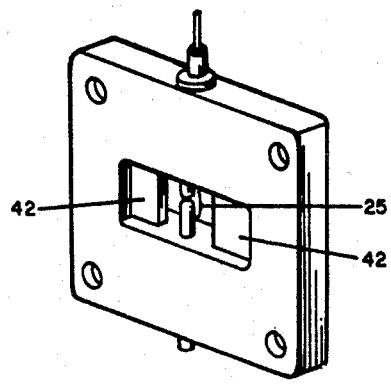
FIGURE 5 illustrates the spark gap plate of FIGURE 1 modified with an iris to compensate for the capacitance introduced by the spark gap.

As expected, I found that when the gap spacings are made small, the gap in the unfired state introduces a large shunt capacitance into the microwave system. An inductive iris 42 located at the spark gap 25 as illustrated in FIGURE 5 will tune out this capacitance.

Figure 6:
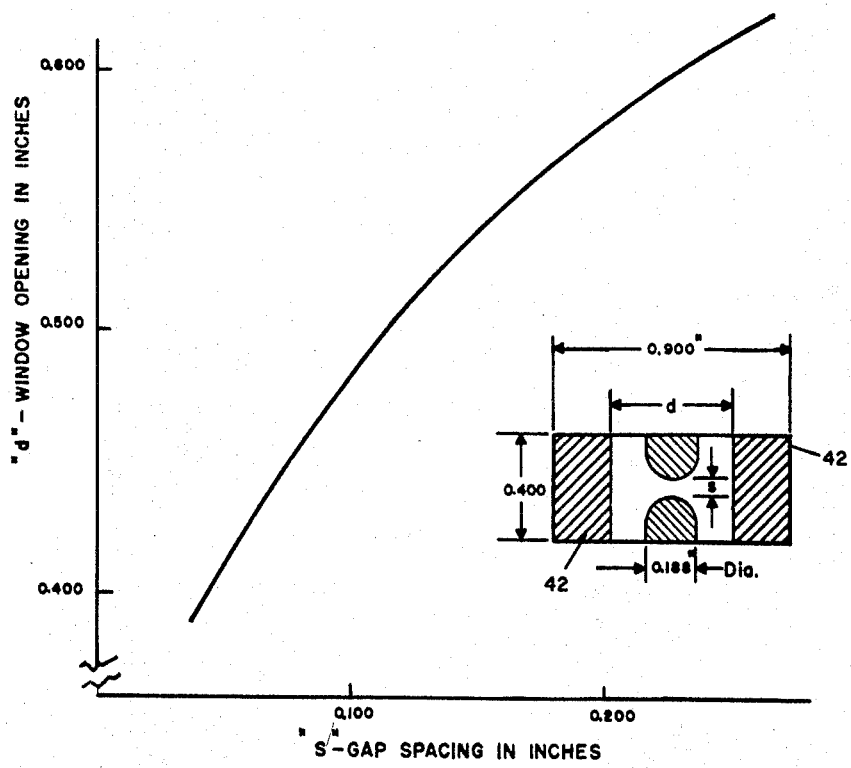
FIGURE 6 presents a graph of iris dimensions for various gap spacings for one particular application.

Approximate window openings, "d," for an iris 42 (1/32 inch thick) to tune out the capacitance introduced by a spark gap having electrodes 0.188 inch in diameter for various gap spacings, "S," are presented in the graph of FIGURE 6 for the x-band system I tested.

Modification illustrated in FIGURE 4

To better control the time of formation of the arc between electrodes 29 and 30, I use the arrangement illustrated in FIGURE 4. This arrangement is preferable at low power levels of microwave energy, because at these power levels the microwave arc may not form, or if it does, its time of formation is not predictable. It is to be understood, however, that the gap spacing S should not be reduced to or below the breakdown spacing $S_B$ for the maximum peak power of microwave pulses expected to be propagated through the system.

I insulate electrodes 29 and 30 from spark gap holder 24 with insulating sleeves 43 and 44 respectively. Press fits or an adhesive, may be used to fix insulating sleeves 43 and 44, and electrodes 29 and 30, in position. These insulating sleeves isolate the microwave system from any direct current voltages that may be introduced at spark gap 25, and electrically isolate electrodes 29 and 30 from each other.

I connect a condenser discharge circuit (including trigger circuit), similar to that disclosed by H. E. Edgerton in the said United States Letters Patent No. 2,478,906, to spark gap 25. Trigger circuit 38 and limiting resistor 39 are connected to trigger wire 37 at a point 40 and to electrode 30 at a point 45. The circuit comprising discharge condenser 48 in parallel with the series circuit of limiting resistor 49 and condenser charging circuit 47 is connected to electrodes 29 and 30 at points 46 and 45 respectively. Limiting resistors 39 and 49 are added to the circuits disclosed in the said Letters Patent to protect trigger circuit 38 and condenser charging circuit 47 from direct shorts across their output terminals that would result from the formation of the arc across electrodes 29 and 30.

To operate, energize trigger circuit 38 and condenser charging circuit 47. Condenser charging circuit 47 thereupon charges discharge condenser 48 to the desired discharge voltage through limiting resistor 49. At the desired time, trip trigger circuit 38. The resulting trigger voltage pulse ionizes the gas in the vicinity of face 33 between trigger wire 37 and electrode 30. Immediately, discharge condenser 48 discharges between electrodes 29 and 30. The discharge is in the form of an arc. As "seen" by the microwave energy being propagated through the wave guide system, the arc is a microwave short circuit. After discharge condenser 48 is discharged, the microwave energy in the system, if sufficient, will maintain a microwave arc.

Description of double spark gap plate

Figure 7:
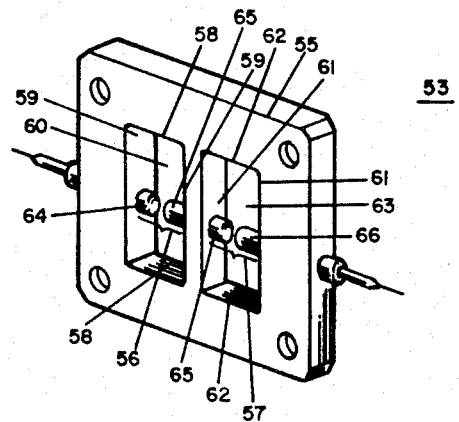
FIGURE 7 is a perspective view of a double spark gap plate having a double spark gap.
Figure 8:
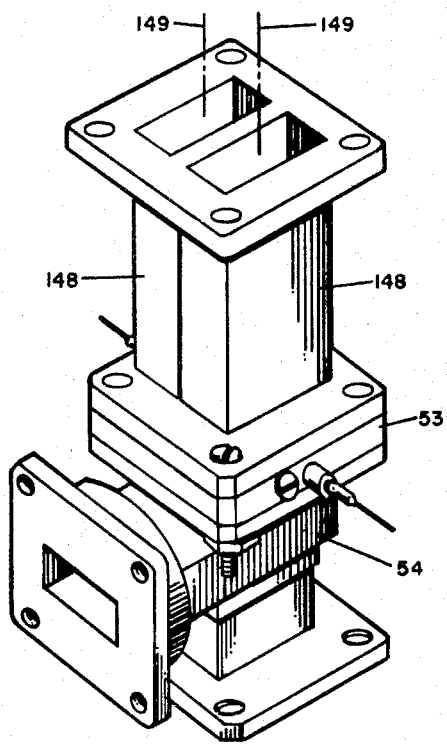
FIGURE 8 illustrates the double spark gap plate of FIGURE 7 utilized with a folded magic tee.

I devised the double spark gap plate 53 illustrated in FIGURE 7 for use with physically parallel wave guides where it is desired that the microwave energy in both wave guides be shorted simultaneously. An example of such use with a folded magic tee 54 and parallel wave guides 148 is illustrated in FIGURE 8.

Double spark gap plate 53 consists of holder 55 and spark gaps 56 and 57. Make spark gap holder 55 of the same material as the wave guides used in the wave guide system where double spark gap plate 53 is employed. Machine and polish interior walls 58 and 59 of rectangular opening 60 and interior walls 61 and 62 of rectangular openings 63 to exactly the same dimensions and finish as the respective interior walls of wave guides 148 with which double spark gap plate 53 is used. Note that rectangular openings 60 and 63 are illustrated as having the same dimensions. This is not necessary, depending upon the particular application which may require the use of physically parallel wave guides having different interior dimensions.

Mount cylindrical electrodes 64, 65 and 66 parallel to walls 58 and 62 and perpendicular to walls 59 and 61. These electrodes are then parallel to the electric fields E' and E'' (illustrated in FIGURE 9) of the microwave energies being propagated in the $TE_{10}$ mode through their respective associated rectangular wave guides. Further, the electrodes should preferably be located at the points where the electric field strength of the $TE_{10}$ modes is strongest.

Description of spark gaps 56 and 57

Associated electrode 64, insulating sleeve 77 and trigger wire 78, and associated electrode 66, insulating sleeve 79 and trigger wire 80 are assembled and mounted in holder 55 in the same manner as associated electrode 30, insulating sleeve 36 and trigger wire 37 of FIGURE 3. Set screws 74 and 76 are used to fix electrodes 64 and 66, respectively, firmly in position in holder 55. Electrodes 64 and 66 are made to fit holder 55 sufficiently tight to be in good electrical contact therewith. These electrodes, like electrodes 29 and 30 of FIGURE 3, are made of any electrically conductive metal such as, for example, copper, brass, or stainless steel.

Cylindrical electrode 65 is made of the same material as electrodes 64 and 66. The fit between electrode 65 and holder 55 must be sufficiently tight to provide good electrical contact between them. Again, I have used a set screw 75 to fix electrode 65 firmly in position. An axial hole 81 approximately 1/16 inch in diameter is drilled in electrode 65. The edges where axial hole 81 emerges should be rounded slightly and polished to avoid sharp edges or protuberances that could cause spontaneous breakdown.

Figure 9:
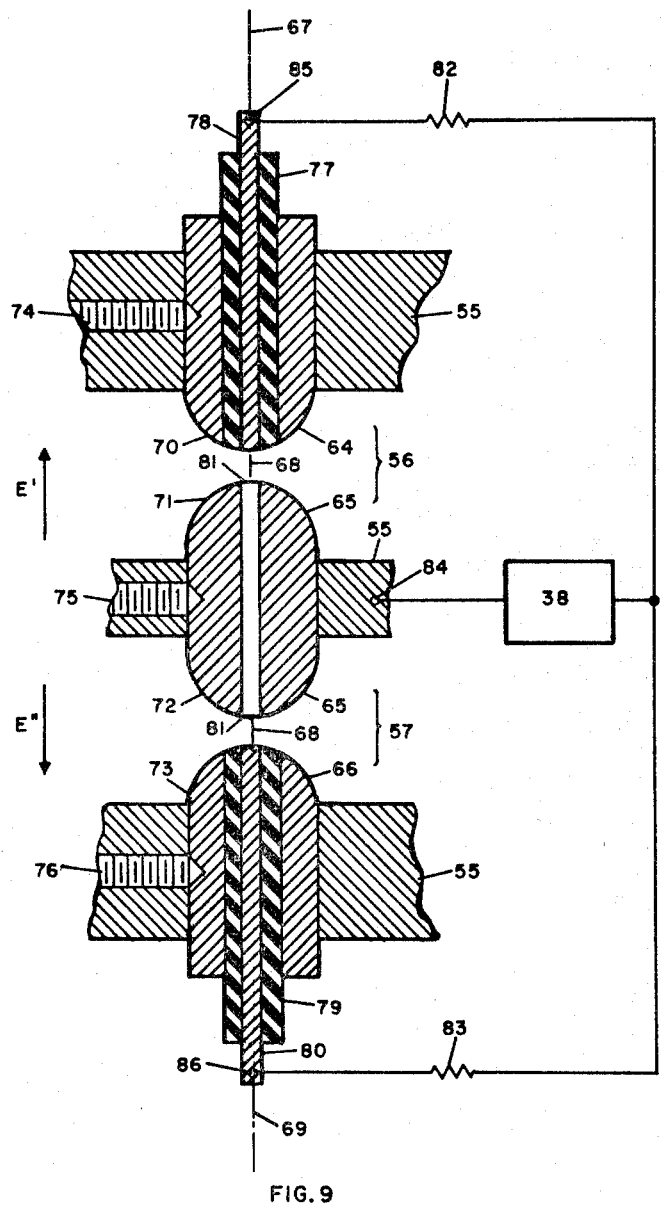
FIGURE 9 is a partial section showing the details of the double spark gap of FIGURE 7 and a block diagram of a trigger circuit.

Faces 70, 71, 72 and 73 must be ground and polished smooth to avoid sharp edges or protuberances for the same reason. They are illustrated in FIGURE 9 as being hemispherical surfaces. Again, a different surface may be more desirable for a particular application. For example, it may be found that faces 71 and 72 of electrode 65 should be conically shaped. Further, the spacing S' between electrode 64 and electrode 65 and the spacing S'' between trigger electrode 65 and electrode 66 should be greater than $S'_B$ and $S''_B$ respectively for the respective peak powers of microwave pulses expected to be propagated past said electrodes.

Trigger circuit connections

Connect one output terminal of trigger circuit 38 to holder 55 at any convenient point 84. Connect the other output terminal of trigger circuit 38 through limiting resistor 82 to trigger wire 78 at a point 85, and also through limiting resistor 83 to trigger wire 80 at a point 86.

Operation

While microwave energy is being propagated in the $TE_{10}$ mode through the rectangular wave guide system, high microwave potentials exist between electrodes 64 and 65, and between electrodes 66 and 65. After trigger circuit 38 is warmed up, trip it at any desired time. A trigger circuit voltage pulse is thereupon delivered to each of spark gaps 56 and 57. Limiting resistor 82 delays delivery of trigger pulse energy to spark gap 56 just enough so that some of the available trigger pulse energy is also delivered to spark gap 57, and vice versa. The trigger circuit voltage pulse ionizes the gas in the vicinity of face 70 between trigger wire 78 and electrode 64, and the gas in the vicinity of face 73 between trigger wire 80 and electrode 66. This ionization is sufficient for the microwave potentials to break down the gaps between electrodes 64 and 65, and between electrodes 66 and 65, thereby creating microwave arcs between these sets of electrodes. Practically these arcs are microwave short circuits.

Triggered spark gaps 56 and 57 fire almost simultaneously. Assume, however, that spark gap 56 fired first. Part of the radiant energy created at the arc falls through axial hole 81 upon electrode 66 and trigger wire 80. This radiant energy creates a minute number of photoelectrons in the gap between electrodes 65 and 66, which photoelectrons assure immediate firing of spark gap 57. The result is that better simultaneity of firing of spark gaps 56 and 57 is achieved, than would exist were axial hole 81 not so used. With this system I have obtained consistently a simultaneity of firing of one nanosecond.

Figure 10:
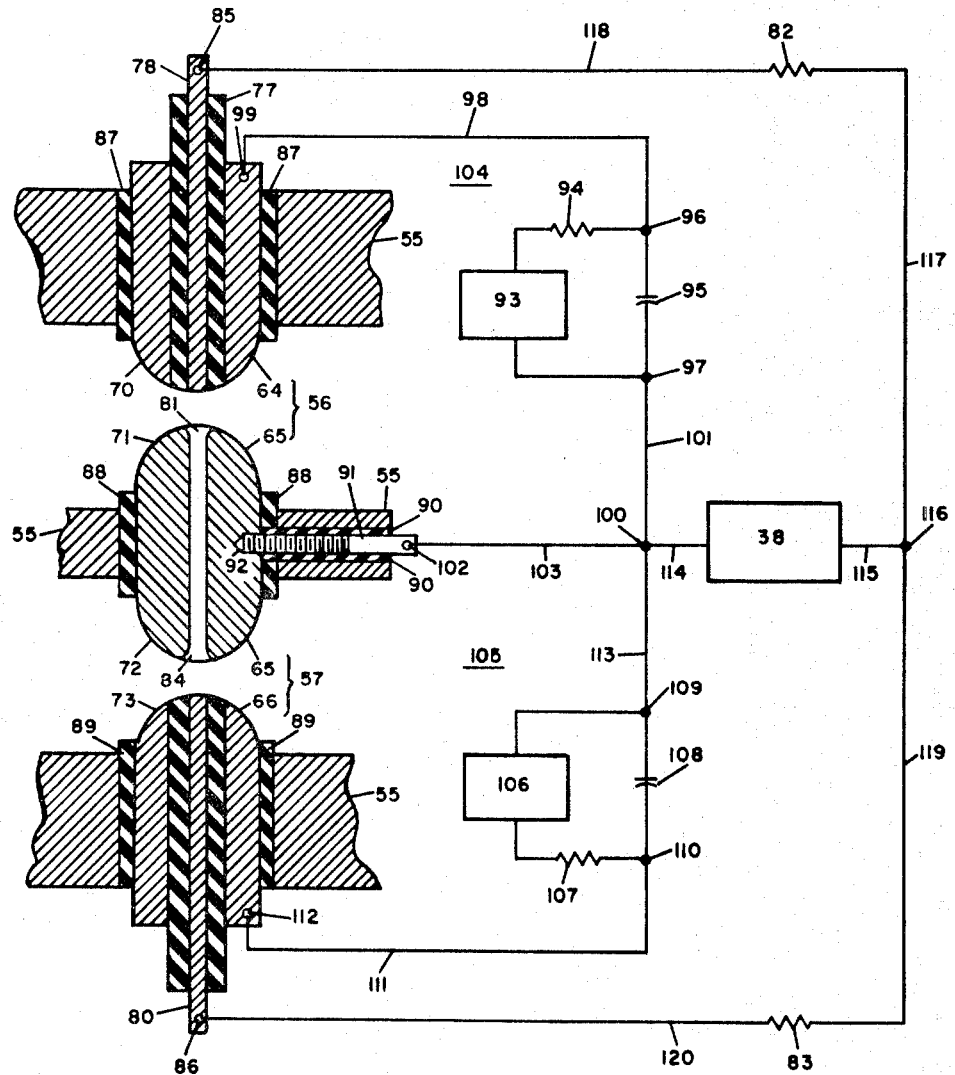
FIGURE 10 illustrates a modification of the double spark gap and circuit of FIGURE 9.

Modification of FIGURE 10

At low microwave power levels, I prefer to use the arrangement in FIGURE 10. This is essentially the arrangement illustrated in FIGURE 4, but modified for the double spark gap plate.

Electrodes 64, 65 and 66 are insulated electrically from holder 55 by sleeves 87, 88 and 89 respectively. Press fits, or an adhesive, may be used to fit insulating sleeves 87, 88 and 89, and electrodes 64, 65 and 66, in position. The spacings S must exceed the respective $S_B$'s.

Any one of many well known means may be utilized to connect a conductor to electrode 65 without making electrical contact with holder 55. I have used the means illustrated in FIGURE 10 wherein a hole is drilled in holder 55 and insulating sleeve 88 to receive insulating sleeve 90. A press fit, or an adhesive, may be used to fix insulating sleeve 90 in position. A hole is drilled and tapped in electrode 65 to receive terminal connector 91 having threads at end 92, thereby providing good electrical contact between electrode 65 and terminal connector 91. The diameter of terminal connector 91 is chosen to provide a good tight fit within insulating sleeve 90.

Condenstr discharge circuit 104 is connected across spark gap 56. Thus the series of condenser charging circuit 93 and its limiting resistor 94 is connected in parallel with discharge condenser 95 at points 96 and 97. Point 96 is connected by conductor 98 to electrode 64 at a point 99. Point 97 is connected to a point 100 by conductor 101 and point 100 is connected to terminal connector 91 at a point 102 by conductor 103.

Likewise, condenser discharge circuit 105 is connected across spark gap 57. Condenser discharge circuit 105 comprises the series circuit of condenser charging circuit 106 and its limiting resistor 107 connected in parallel with discharge condenser 108 at points 109 and 110. Conductor 111 connects point 110 to a point 112 on electrode 66. Conductor 113 connects point 109 to point 100 and by way of conductor 103 to point 102 on terminal connector 91.

One terminal of trigger circuit 38 is connected to point 102 on terminal connector 91 by way of conductor 114, point 100 and conductor 103. The other terminal of trigger circuit 38 is connected to trigger wire 78 at a point 85 by way of conductor 115, point 116, conductor 117, limiting resistor 82 and conductor 118. The latter terminal of trigger circuit 38 is also connected to trigger wire 80 at a point 86 by way of conductor 115, point 116, conductor 119, limiting resistor 83 and conductor 120.

To operate the arrangement of FIGURE 10, energize trigger circuit 38 and condenser charging circuits 93 and 106. Condenser charging circuits 93 and 106 thereupon charge discharge condensers 95 and 108 respectively, through the respective limiting resistors 94 and 107. At the desired time trip trigger circuit 38 which then delivers trigger voltage pulses to spark gaps 56 and 57. These voltage pulses ionize the gas in the vicinity of face 70 between trigger wire 78 and electrode 64 of spark gap 56, and the gas in the vicinity of face 73 between trigger wire 80 and electrode 66 of spark gap 57. Immediately discharge condensers 95 and 108 discharge between electrodes 64 and 65 of spark gap 56, and between electrodes 66 and 65 of spark gap 57, respectively. These discharges are in the form of arcs which "look" like short circuits to the microwave energy in the system. The microwave energy in the system, if sufficient, will maintain microwave arcs after discharge condensers 95 and 108 have completely discharged.

Also, if for example, spark gap 57 fires first, the radiant energy produced by its arc falls through hole 81 upon electrode 64 and trigger wire 78. The minute number of photoelectrons created aid in the firing of spark gap 56 resulting in better simultaneity of firing of both spark gaps.

It will be obvious to those skilled in the art that other circuit arrangements may be utilized with double spark gap plate 53. For example, hole 81 may be eliminated or separate trigger circuits may be operated in conjunction with each of spark gaps 56 and 57.

Spark gap shunt capacitance compensation

As heretofore discussed, when the gap spacings are made small, the spark gap in the unfired state introduces a large shunt capacitance into the microwave system. One well known means of tuning out such capacitance is to use the inductive iris 42 illustrated in FIGURES 5 and 6.

Figure 11:
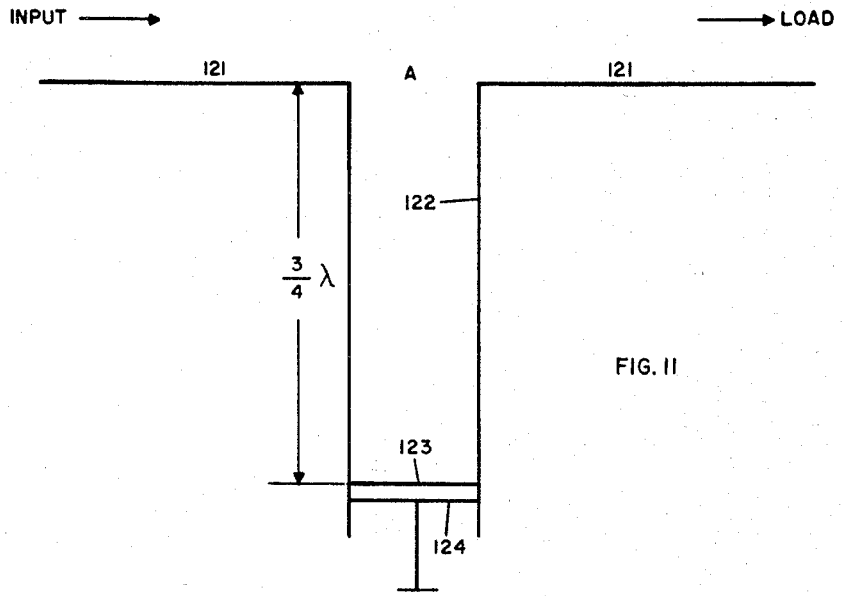
FIGURE 11 illustrates schematically a sliding short in a wave guide system.

Properly locating a sliding short is another means that may be utilized to tune out spark gap capacitance. FIGURE 11 illustrates schematically a wave guide section 122 connected to a main wave guide section 121 to form E-plane junction, A. Located at three-quarters of a wave length ($3\lambda/4$) from junction A is face 123 of sliding short 124. Sliding short 124 makes good electrical contact with the interior surfaces of wave guide section 122. With face 123 located $3\lambda/4$ from junction A, input microwave energy "sees" an open circuit at junction A and will not be propagated into the load.

Figure 12:
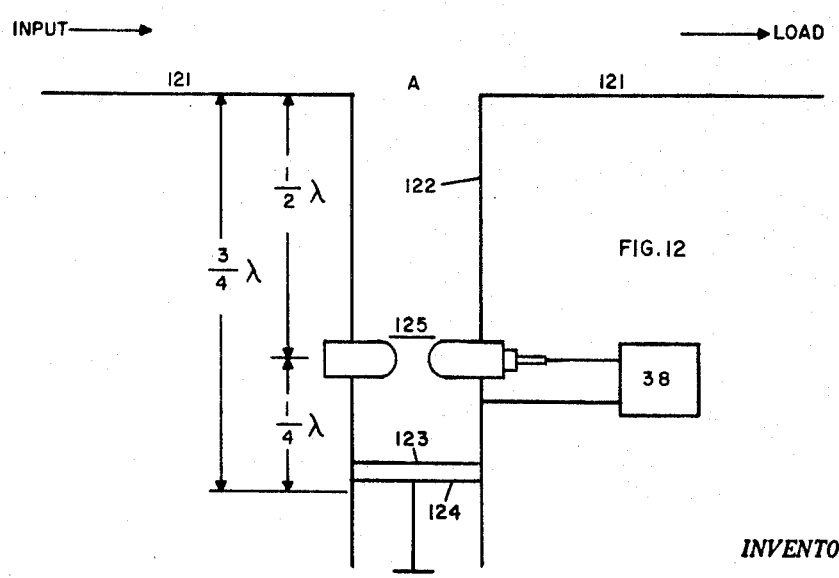
FIGURE 12 illustrates schematically the use of a sliding short to compensate for the capacitance introduced by the spark gap.

In FIGURE 12 triggered spark gap 125 is located one-half wave length $\lambda/2$ from E-plane junction, A. In the unfired state it introduces a capacitive reactance into the microwave circuit. By making the distance from spark gap 125 to face 123 of sliding short somewhat less than one-quarter wave length ($<\lambda/4$), the sliding short 124 "looks" like an inductive reactance at spark gap 125. Thus by adjusting the location of face 123, the capacitive reactance of spark gap 125 can be exactly tuned out. When this is done, the microwave energy in the system "sees" an open circuit at spark gap 125 and at junction A. When spark gap 125 is fired, the microwave energy in the system "sees" a short at spark gap 125 and at junction A, and may be propagated into the load.

Spark gap in a tapered wave guide section

Figure 13:
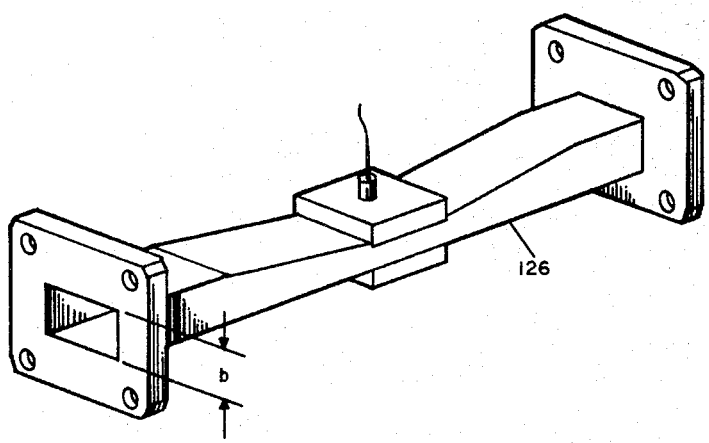
FIGURE 13 is a perspective view of a tapered wave guide section utilizing a spark gap of the present invention.
Figure 14:
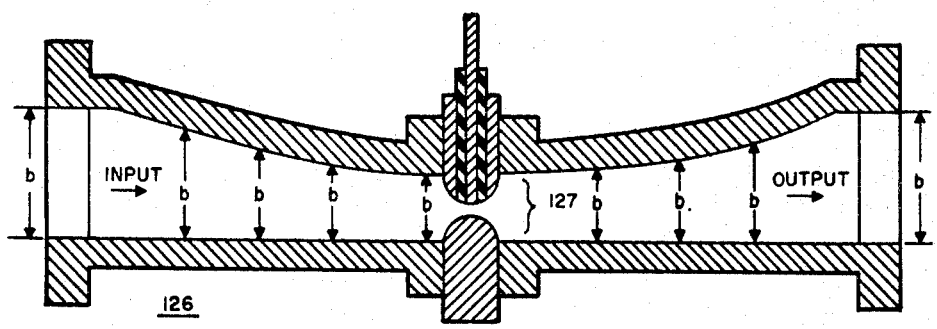
FIGURE 14 is an enlarged partial section of the wave guide section and spark gap of FIGURE 13.

FIGURES 13 and 14 illustrate a means of reducing spark gap reactance to a practical minimum while increasing the power handling ability of the spark gap. The electrodes of spark gap 127 are mounted so that only the hemispherical faces of the electrodes protrude into the wave guide. The unfired spark gap will then present the minimum reactance to the microwave energy in the system. The "b" dimension of the wave guide section at the electrodes is made such that the desired gap spacing, S, will be achieved. The "b" dimension is then gradually increased in each direction at a sufficient rate and for a sufficient distance to make the reflection coefficient from the taper a minimum.

I have, for example, used an exponential taper for a distance of $3\lambda/2$ in each direction as illustrated in FIGURE 14. This resulted in a reflection coefficient of zero.

Figure 19:
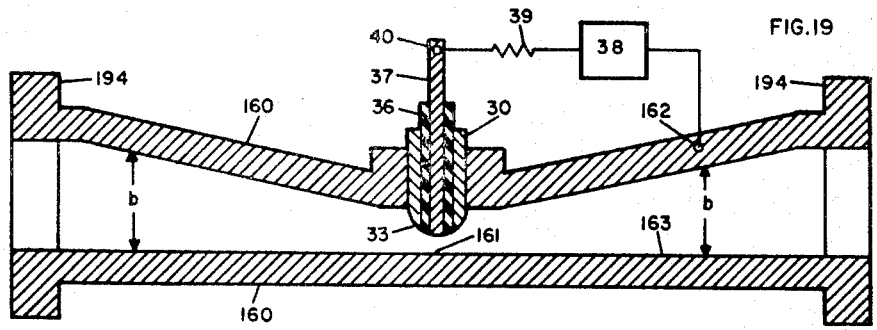
FIGURE 19 illustrates another modification in a tapered wave guide having a different taper than that illustrated in FIGURE 14.
Figure 24:
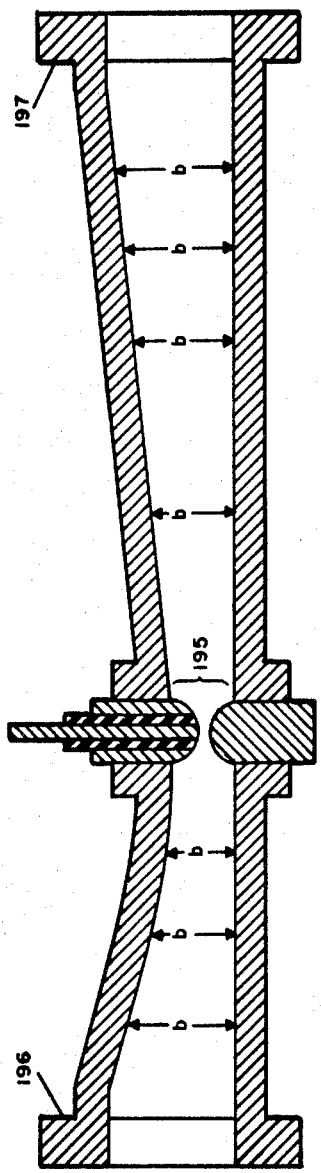
FIGURE 24 illustrates a modified tapered wave guide incorporating features of FIGURES 14 and 19.

In FIGURE 19 the spark gap is shown located midway between flanges 194 with the taper increasing uniformly between the spark gap and flanges 194. However, it is not necessary that the spark gap be located midway between the flanges or that the taper be the same on each side of the spark gap. Thus, in FIGURE 24, spark gap 195 is not located midway between flanges 196 and 197. Note that the "b" dimension between spark gap 195 and flange 196 is illustrated as increasing exponentially, whereas between spark gap 195 and flange 197 it increases at a uniform rate.

In testing this arrangement I found that undesirable voltage multiplication does not occur at the spark gap; the reflection coefficient of the guide is reduced; Q is reduced; losses are reduced; bandwidth is increased; and power handling ability without spontaneous breakdown at the electrodes is greatly increased.

Figure 15A:
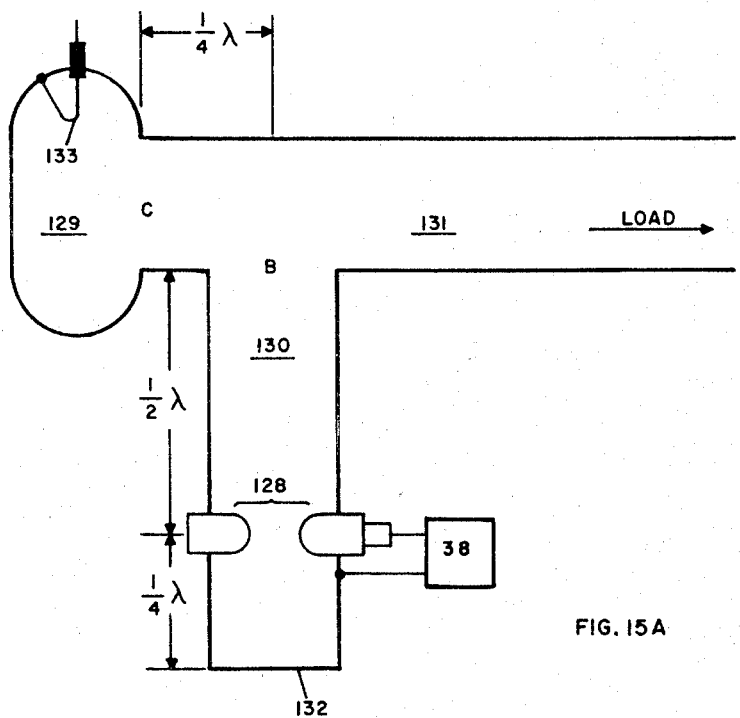
FIGURE 15A illustrates schematically the use of the present invention for discharging a microwave cavity into a load.
Figure 15B:
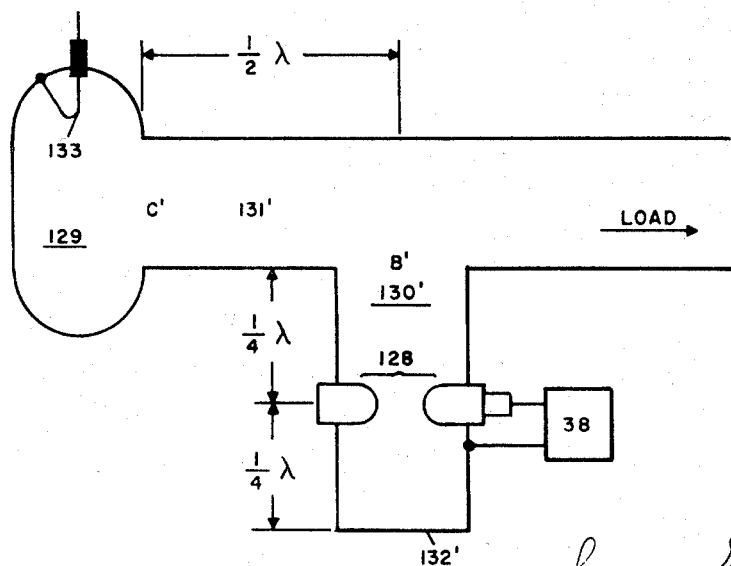
FIGURE 15B illustrates schematically a modification of the system of FIGURE 15A.

Arrangements of FIGURES 15A and 15B

FIGURES 15A and 15B illustrate schematically the use of spark gap 128 in two different arrangements for discharging resonant microwave cavity 129 into a load.

E-plane junction B in FIGURE 15A between wave guide sections 130 and 131 is located $\lambda/4$ from junction C between wave guide section 131 and resonant cavity 129. Permanent short 132 is located exactly $3\lambda/4$ from junction B. Iris capacitance compensated spark gap 128 is located $\lambda/2$ from junction B. Note that the sliding short of FIGURE 12 could be used instead of permanent short 132 to compensate for the capacitive reactance introduced by spark gap 128.

Resonant microwave cavity 129 is excited, for example, by an energy pulse fed in by a coupling probe such as current loop 133. With compensated spark gap 128 in the unfired state, the microwave energy in cavity 129 "sees" a short circuit at junction C and will not be propagated into the load. The reason for this is that the permanent wave guide short 132 "looks" like an open circuit at spark gap 128, which is $\lambda/4$ distant; this open circuit appears as an open circuit at junction B which is $\lambda/2$ distant from spark gap 128; the open circuit at junction B "looks" like a short circuit $\lambda/4$ distant from junction B at junction C.

When spark gap 128 is fired, a short circuit is created which appears at junction B as a short circuit. The short circuit at junction B permits the microwave energy in cavity 129 to immediately discharge as a pulse into the load and the arc across the electrodes of spark gap 128 thereafter extinguishes. The system is then ready for excitation again.

In FIGURE 15B H-plane junction B' between wave guide sections 130' and 131' is located $\lambda/2$ from junction C' between wave guide section 131' and resonant cavity 129. Permanent short 132' is located $\lambda/2$ from junction B'. Iris compensated spark gap 128 is located $\lambda/4$ from junction B'.

With cavity 129 excited and spark gap 128 in the unfired state, permanent short 132' "looks" like a short circuit $\lambda/2$ distant at junction B' and again as a short circuit $\lambda/2$ distant at junction C'.

When spark gap 128 is fired, a short circuit is created which looks like an open circuit at junction B' and at junction C'. The microwave energy in cavity 129 immediately discharges as a pulse into the load and the arc across the electrodes of spark gap 128 thereafter extinguishes. The system is then ready for excitation again.

Figure 16:
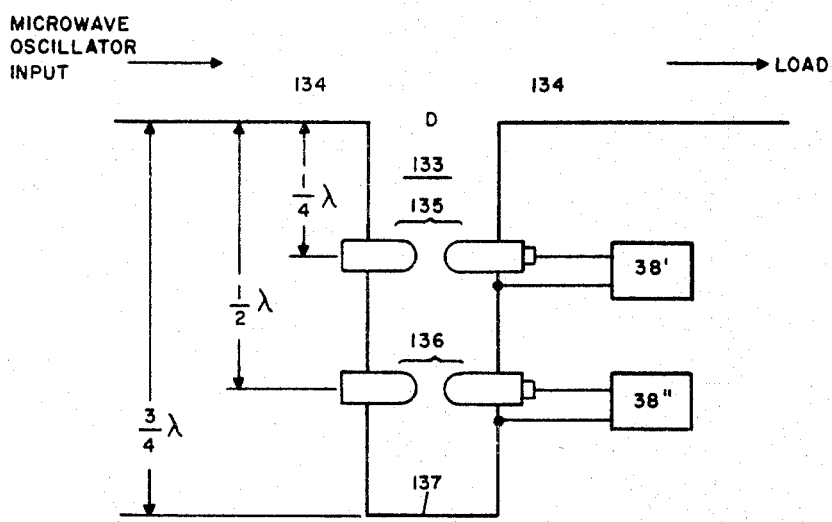
FIGURE 16 illustrates schematcially the use of the present invention for closing and opening a microwave circuit between a microwave oscillator and its load.

Arrangement of FIGURE 16

FIGURE 16 illustrates schematically the use of two spark gaps to close and then open a microwave circuit between a microwave oscillator and its load.

Wave guide section 133 is connected to main wave guide section 134 to form E-plane junction D. Iris compensated spark gap 135 is located $\lambda/4$ from junction D. Spark gap 136 is located $\lambda/2$ from junction D. If 137 is a permanent short on wave guide section 133, spark gap 136 must be iris compensated and short 137 must be located exactly $3\lambda/4$ from junction D. However, if 137 is a sliding short it should be adjusted to a distance somewhat less than $3\lambda/4$ to compensate for the capacitive reactance of spark gap 136 which need not then be iris compensated.

With microwave energy being fed into the system by the microwave oscillator and with both spark gaps 135 and 136 in the unfired state, short 137 "looks" like an open circuit at spark gap 136 and at junction D, and no microwave energy is propagated to the load. If spark gap 136 is fired, the microwave energy "sees" a short circuit at spark gap 136 and at junction D. The microwave energy is then propagated to the load. Later, when spark gap 135 is fired, the microwave energy "sees" a short circuit at spark gap 135 $\lambda/4$ distant at junction D it "sees" an open circuit. The microwave energy is then no longer propagated to the load. The microwave arc at spark gap 136 is thereupon extinguished. However, the microwave energy in the system maintains the arc at spark gap 135 until the microwave oscillator is de-energized.

Two-electrode spark gaps

Figure 17:
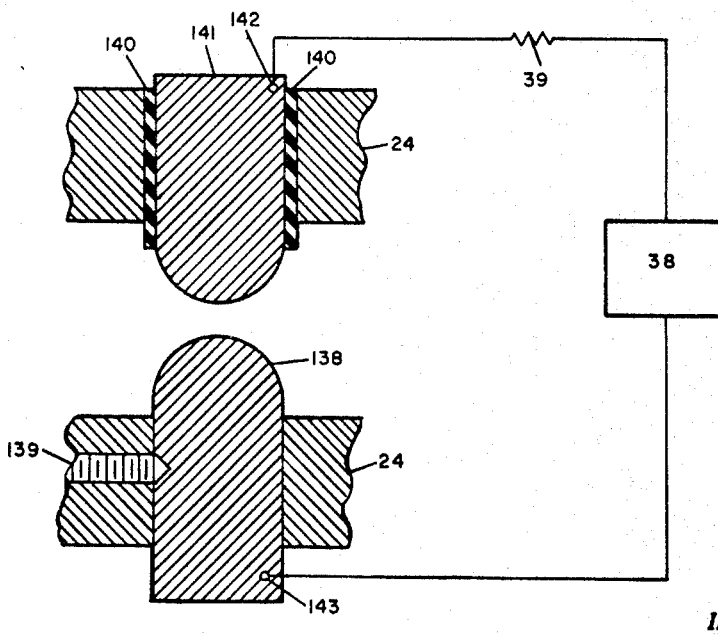
FIGURE 17 illustrates a partial section showing the details of a spark gap having only two electrodes with a block diagram of an associatad trigger circuit.

I have found that if trigger circuit 38 delivers a large enough trigger voltage pulse, trigger wires 37 of FIGURES 3 and 4, and 78 and 80 of FIGURES 9 and 10, are not needed. FIGURE 17 illustrates an arrangement in which the trigger wire is eliminated. Here, I make the fit between electrode 138 and spark gap holder 24 sufficiently tight to provide good electrical contact between them. Set screw 139 fixes electrode 138 securely in position. Sleeve 140 insulates electrode 141 from spark gap holder 24. Press fits, or an adhesive, are used to fix insulating sleeve 140 and electrode 141 in position. Again, the spacing, S, between electrodes 138 and 141 must be slightly greater than the $S_B$ for the peak power, $P_P$, of microwave energy pulses to be transmitted through the system. The series circuit of limiting resistor 39 and trigger circuit 38 is connected to electrode 141 at a point 142 and to electrode 138 at a point 143.

While microwave energy is being propagated through the wave guide system, a microwave potential exists across electrodes 138 and 141. After trigger circuit 38 is warmed up, it may be tripped at any desired time. A sufficiently large trigger circuit voltage pulse will ionize the gas in the space between electrodes 141 and 138 sufficiently for the microwave potential to break down the gap between electrodes 141 and 138 thereby creating a microwave arc between them. I found that a 4 kilovolt trigger pulse was sufficiently large to initiate breakdown for gap spacings, S, slightly greater than $S_B$.

Figure 18:
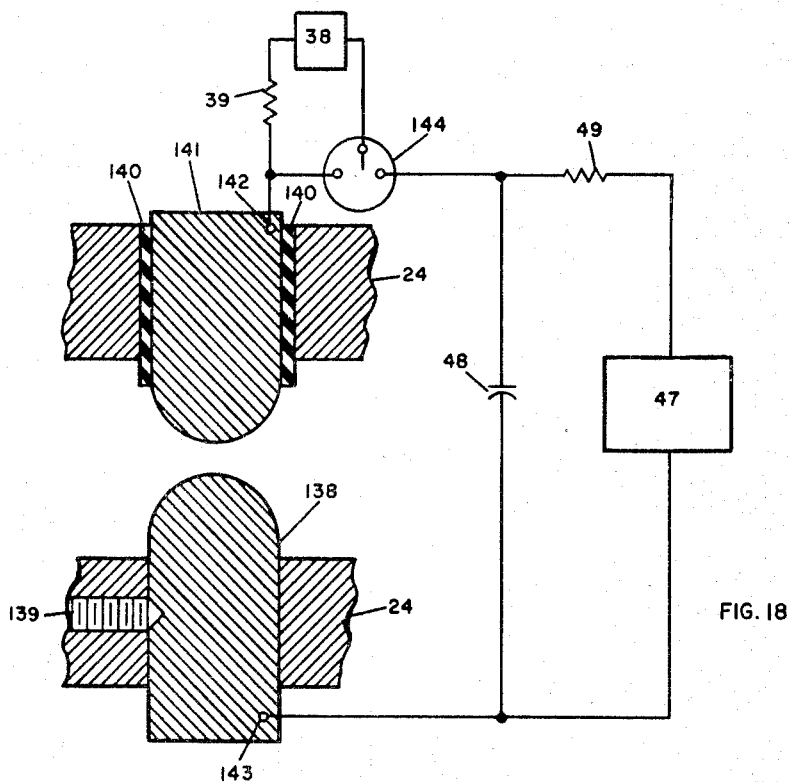
FIGURE 18 illustrates a modification of the system illustrated in FIGURE 17.

If the microwave power level is two low to cause breakdown with a trigger pulse and $S_B$ is so small that a spark gap having a spacing S slightly greater than $S_B$ would introduce a significant discontinuity into the microwave system, S may be made significantly greater than $S_B$ and the arrangement illustrated in FIGURE 18 may be utilized. Here, when trigger circuit 38 is tripped, the gas in external triggered spark gap 144 is ionized and discharge condensor 48 discharges through spark gap 144 and across electrodes 138 and 141.

FIGURE 19 illustrates another arrangement utilizing two electrodes in a rectangular wave guide section 160 having a taper different from that illustrated in FIGURE 14. Here, electrode 30, sleeve 36 and trigger wire 37 of FIGURE 3 are shown mounted with hemispherical face 33 protruding into wave guide section 160. Again, the spacing S, between hemispherical face 33 and point 161 opposing face 33 on the opposite surface 163, must be greater than $S_B$ for the peak power, $P_P$, of microwave energy pulses expected to be transmitted through the system. Electrode 30 is mounted as heretofore described so as to be in electrical contact with wave guide section 160. The series circuit of trigger circuit 38 and limiting resistor 39 are connected to wave guide section 160 at a point 162 and to trigger wire 37 at a point 40. While microwave energy is being propagated through wave guide section 160 a microwave potential exists between face 33 of electrode 30 and point 161 opposing face 33 on the opposite surface 163. When trigger circuit 38 is tripped the trigger circuit voltage pulse ionizes gas in the vicinity of face 33 between trigger wire 37 and electrode 30. This ionization is sufficient for the microwave potential to break down the gap creating a microwave arc between face 33 and point 161.

Figure 20:
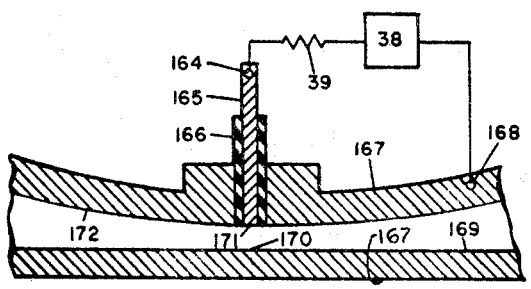
FIGURE 20 is a modification of the arrangement illustrated in FIGURE 19.

FIGURE 20 illustrates another modification. Sleeve 166 and trigger wire 165 are mounted as illustrated with their common interior face 171 flush with surface 172 of wave guide section 167. Similarly, spacing S between interior face 171 and point 170 on surface 169 opposite face 171 must be greater than $S_B$ for the peak power, $P_P$, of microwave energy pulses expected to be transmitted through the system. Trigger circuit 38 and limiting resistor 39 are connected as illustrated to point 164 on trigger wire 165 and to a point 168 on wave guide section 167. While microwave energy is being propagated through the system a microwave potential exists between point 170 on surface 169 opposite trigger wire 165 and surface 172 in the vicinity of trigger wire 165. When trigger circuit 38 is tripped the trigger voltage pulse ionizes the gas between trigger wire 165 and that portion of surface 172 in close proximity thereto. This ionization is sufficient for the microwave potential to break down creating a "shorting" arc between point 170 on surface 169 and surface 172 in the vicinity of trigger wire 165.

*Location of spark gap*

Figure 21:
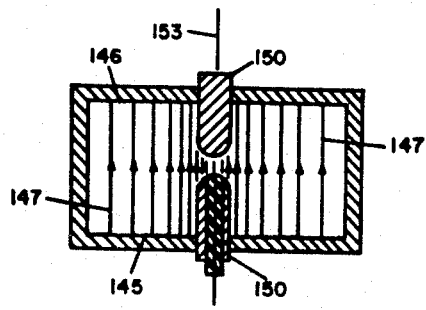
FIGURE 21 illustrates in cross section the preferred location of a spark gap in a rectangular wave guide section through which microwave energy is being propagated in the $TE_{10}$ mode.

FIGURE 21 illustrates the preferred location of the electrodes of spark gap 150 in a rectangular wave guide system through which microwave energy is being propagated in the $TE_{10}$ mode. Solid lines 147 represent the electric field, and the arrowheads superimposed thereupon indicate the direction of the electric field as proceeding from boundary 145 to boundary 146 of the electric field. The magnetic field of the microwave energy is not shown for the sake of simplicity. The strength of the electric field is illustrated by the frequency of occurrence of lines 147. Thus, the electric field strength is greatest at spark gap 150.

As heretofore stated I found that the electrodes of spark gap 150 should be placed with their axes 153 and 154 parallel to the electric field, as represented by lines 147. One electrode of spark gap 150 should be located at boundary 145 and the other electrode should be located at boundary 146 of the electric field. Also, for the best results, the electrodes should be located where the electric field strength is greatest, as illustrated in FIGURE 21. The same principles apply to any mode of propagation in any type of wave guide, whether it be rectangular, circular, or elliptical.

Figure 22:
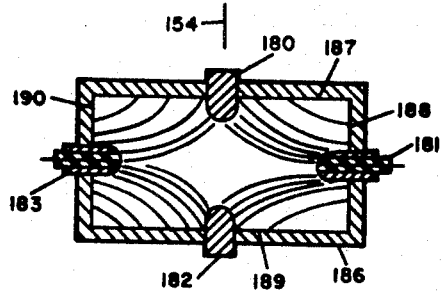
FIGURE 22 illustrates in cross section the preferred location of a spark gap in a rectangular wave guide section through which microwave energy is being propagated in the $TE_{11}$ mode.

Thus, FIGURE 22 illustrates the electric field of microwave energy in the $TE_{11}$ mode in a rectangular wave guide section 186. Electrodes 180, 181 and 182, 183 are located at boundaries 187, 188 and 189, 190, respectively, where the electric field strength is greatest, with their axes substantially parallel to the electric field at those points.

Figure 23:
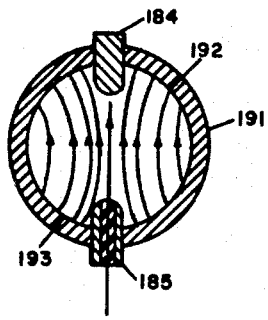
FIGURE 23 illustrates in cross section the preferred location of a spark gap in a circular wave guide section through which microwave energy is being propagated in the $TE_{11}$ mode.

Likewise, FIGURE 23 illustrates the electric field of microwave energy in the $TE_{11}$ mode in a circular wave guide section 191. Electrodes 184 and 185 are located at boundaries 192 and 193 respectively, where the electric field strength is greatest with their axes substantially parallel to the electric field at said points.

*Conclusion*

It will be apparent to those skilled in the art that the spark gap provides extremely fast means for shorting microwave energy in a wave guide system. It should be understood that certain features of the invention may be used in combinations other than those illustrated.

According to the provisions of the patent statutes, I have explained the principle of my invention and described how to make and use it in several embodiments. Moreover, I desire to have it understood that, within the scope of the appended claims, the invention may be practiced otherwise than as specifically illustrated and described.

I claim:
1. Microwave switching apparatus for use in a microwave system designed to transmit high power microwave energy pulses having predetermined peak powers of $P_P'$ and $P_P''$, said microwave switching apparatus comprising, in combination:
   a first wave guide section through the gaseous dielectric of which may be propagated each of said microwave energy pulses having peak powers of $P_P'$, with the boundaries of their electric fields located at opposing walls of said first wave guide section;
   a second wave guide section located parallel to and having a wall common with said first wave guide section, through the gaseous dielectric of which may be propagated each of said microwave energy pulses having peak powers $P_P''$, with the boundaries of their electric fields located at opposing walls of said second wave guide section, neither of which opposing walls are common with said first wave guide section; and
   spark gap means disposed within said first and second wave guide sections and having exterior electrical connections, said means being adapted when unenergized by direct current pulses of electrical energy to permit transmission of said high power microwave energy pulses through said respective wave guide sections, but when energized by direct current pulses of electrical energy to initiate the formation of electrical arcs that substantially short said high power microwave energy pulses then being transmitted past said means in each of said wave guide sections, said spark gap means comprising
      a common electrode mounted through said common wall with its axis parallel to the electric fields of, and its faces protruding into, said first and second wave guide sections,
      an electrode mounted on the wall opposing said common wall in said first wave guide section with its face opposing a face of said common electrode and spaced therefrom a distance S greater than $S_B'$; and
      an electrode mounted on the wall opposing said common wall in said second wave guide section with its face opposing the other face of said common electrode and spaced therefrom a distance S greater than $S_B''$.

2. Microwave switching apparatus as in claim 1 in which:
   said common electrode has an axial hole drilled therethrough; and
   each of said electrodes, mounted on the walls opposing said common wall in said first and second wave guide sections, has a trigger electrode insulatingly mounted coaxially therewithin.

3. Microwave switching apparatus as in claim 2 in which said common electrode and said electrodes are insulated from said first and second wave guide sections.

4. Microwave switching apparatus as in claim 2 further comprising a trigger circuit connected between a trigger electrode and its associated electrode, said trigger circuit being adapted when energized, to deliver a direct current pulse of electrical energy across said trigger electrode and its associated electrode.

5. Microwave switching apparatus as in claim 3 further comprising:
   condenser discharge circuits connected between each electrode and said common electrode;
   trigger circuits connected between each electrode and its coaxial trigger electrode; and
   means for energizing said trigger circuits to cause said condenser discharge circuits to discharge between each electrode and said common electrode.

(References on following page)

References Cited by the Examiner

UNITED STATES PATENTS

| | | | |
|---|---|---|---|
| 2,478,906 | 8/1949 | Edgerton | 320—1 |
| 2,491,971 | 12/1949 | Hall et al. | 333—13 X |
| 2,697,800 | 12/1954 | Roberts | 315—39 |
| 2,710,932 | 6/1955 | Heins | 315—39 |
| 2,734,171 | 2/1956 | Heins | 333—81 |
| 2,773,243 | 12/1956 | Goldstein et al. | 333—13 |
| 2,807,714 | 9/1957 | Foin | 325—24 |
| 2,892,983 | 6/1959 | Larson | 315—39 |
| 2,916,707 | 12/1959 | Scott | 333—13 |
| 2,930,004 | 3/1960 | Coale | 333—13 X |

OTHER REFERENCES

Terman: "Electronic and Radio Engineering," McGraw-Hill, New York, 1955, p. 1020.

"Generation and Transmission of Microwave Energy," TM 11–673 Department of The Army, United States Government Printing Office, Washington, 1953, p. 60.

Montgomery et al.: "Principles of Microwave Circuits," McGraw-Hill, New York, 1948, p. 164.

Huxley: "Wave Guides," Macmillan, New York, 1947, pp. 157–177.

HERMAN KARL SAALBACH, *Primary Examiner.*

G. TABAK, M. NUSSBAUM, E. LIEBERMAN,
*Assistant Examiners.*